J. B. PEARSON & E. W. PIERCE.
LIGHT DISTRIBUTING DEVICE.
APPLICATION FILED MAR. 12, 1908.

909,447.

Patented Jan. 12, 1909.

3 SHEETS—SHEET 2.

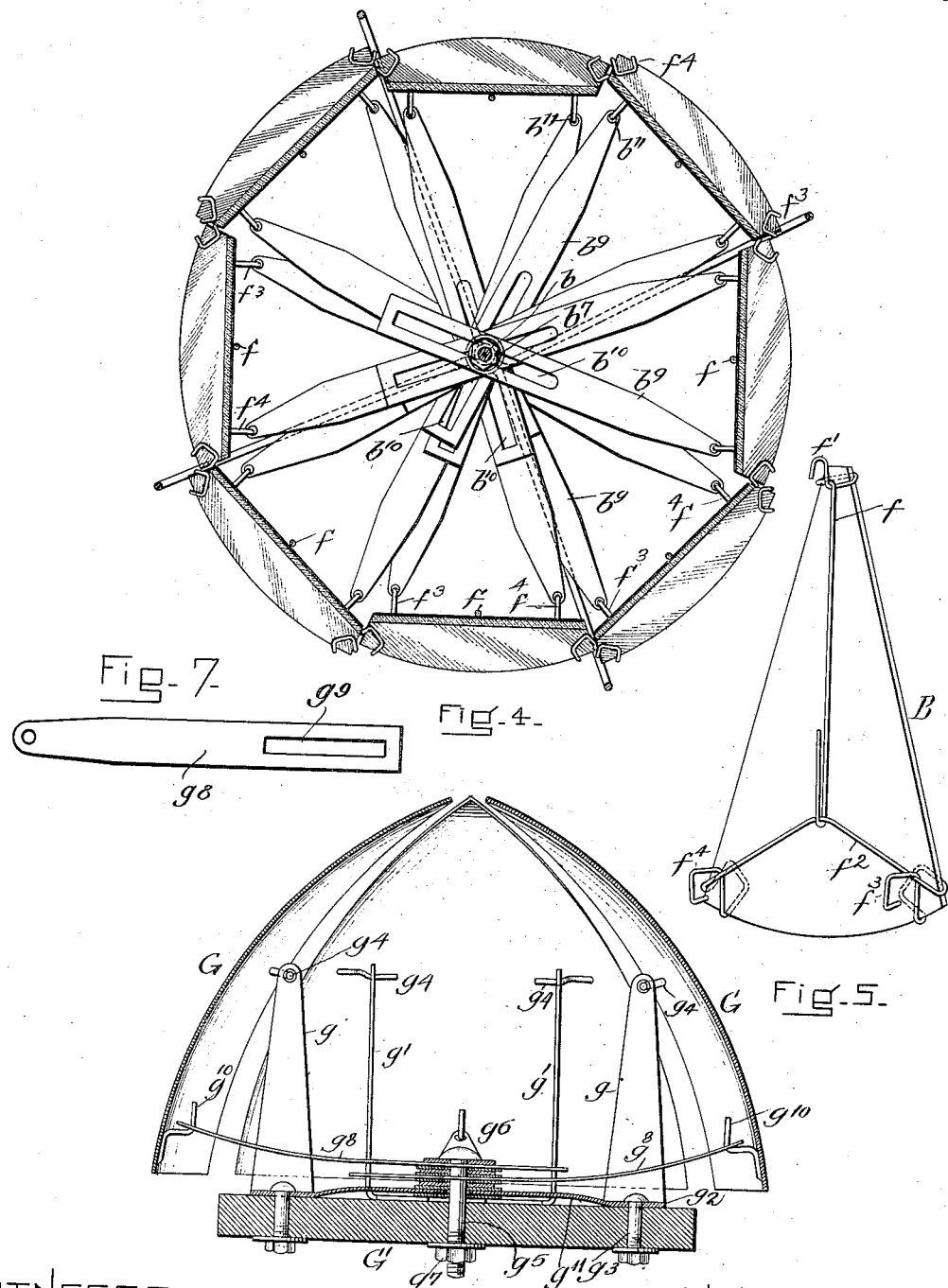

UNITED STATES PATENT OFFICE.

JOHN B. PEARSON, OF STONEHAM, MASSACHUSETTS, AND ERNEST W. PIERCE, OF OLEAN, NEW YORK.

LIGHT-DISTRIBUTING DEVICE.

No. 909,447.　　　　Specification of Letters Patent.　　　Patented Jan. 12, 1909.

Application filed March 12, 1908. Serial No. 420,606.

*To all whom it may concern:*

Be it known that we, JOHN B. PEARSON, of Stoneham, in the county of Middlesex and State of Massachusetts, and ERNEST W. PIERCE, of Olean, in the county of Cattaraugus and State of New York, both citizens of the United States, have invented a new and useful Improvement in Light-Distributing Devices, of which the following is a full, clear, and exact description, reference being had to the accompanying drawings, forming a part of this specification, in explaining its nature.

The invention relates to an improvement in light-distributing devices of the kind in which there is employed a burner, a reflecting dome and corollary thereto a series of light-distributing faces adapted to receive the light reflected by the dome and cast the same in any desired direction or such direction or directions as depends upon the adjustable angular variation in the position of the faces.

The essential purpose or use of a light distributing device to which our invention pertains is to properly concentrate and distribute rays of light from a single lamp or light and enable these rays properly concentrated and distributed to effect the proper lighting of a series of objects which, were the device not employed, would necessitate the use of several lights or lamps to effect a proper lighting of them. This is especially true of factories or shops where machines are arranged in series. In such places it is necessary oftentimes to throw a strong light upon some one portion of the machine. Accordingly the custom has been to employ a great many lights. By the use of a device, however, like that to which our invention pertains not only need a less number of lights be employed but the light is concentrated on those exact points where the light is most needed and accordingly is better utilized.

The invention pertains to various improvements in combination and arrangement, all of which can best be seen and understood by reference to the drawings, in which—

Figure 1:
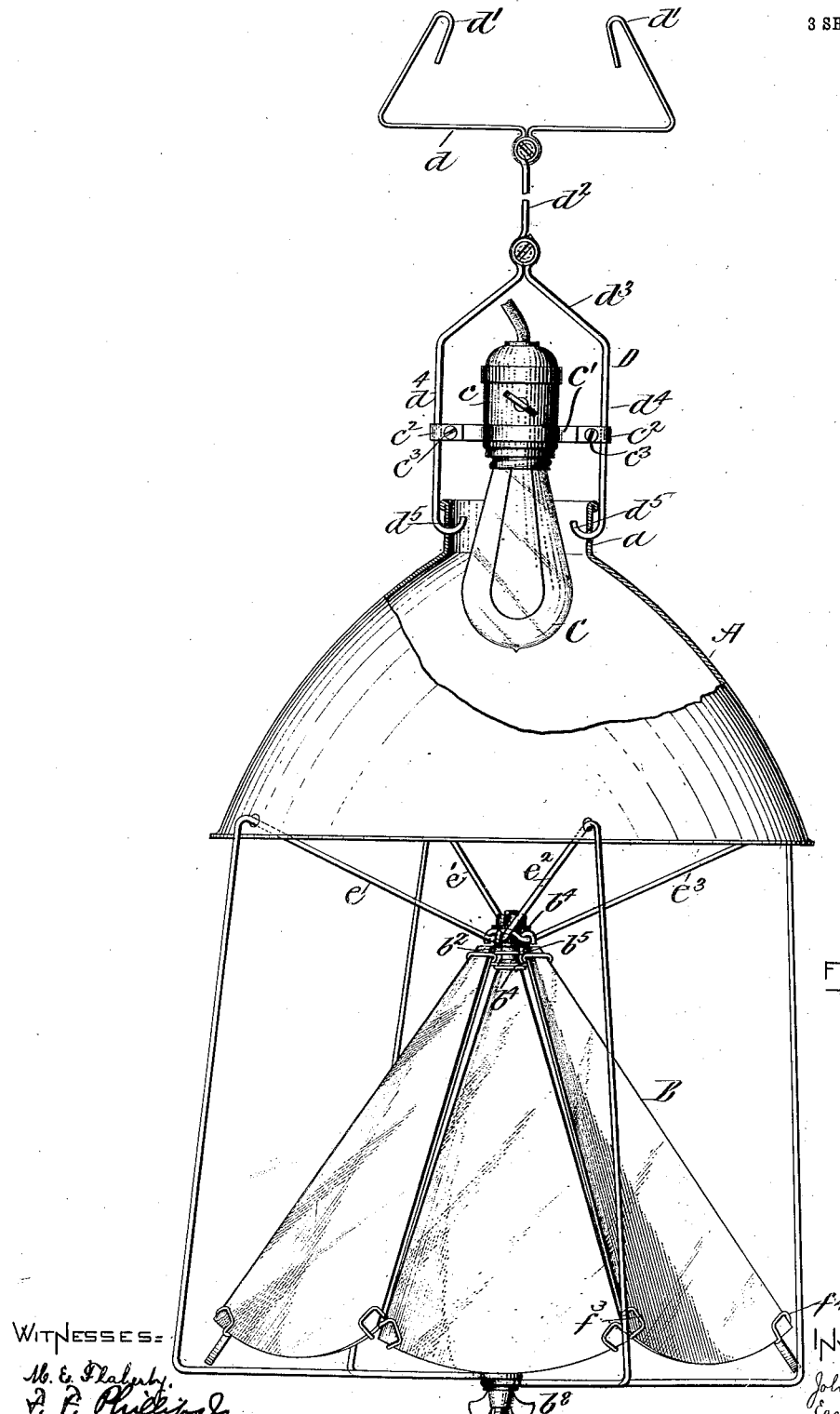
Figure 2:
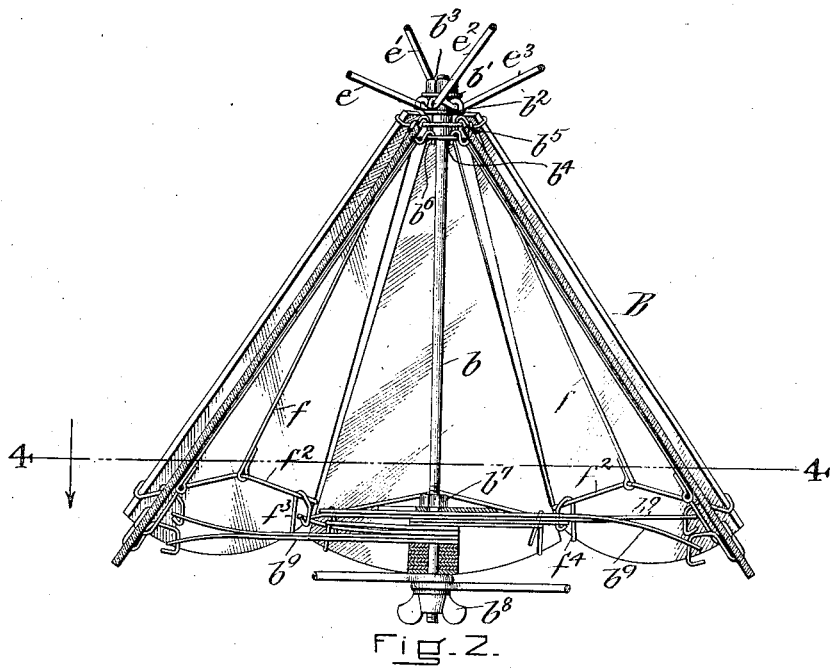
Figure 3:
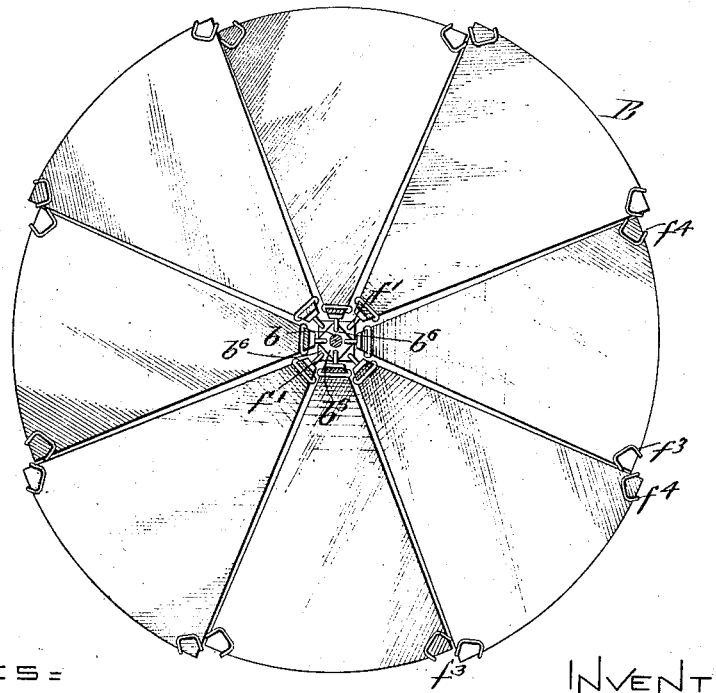

Figure 1 shows the improved device mainly in elevation but partly in vertical section. Fig. 2 shows a vertical cross section of the light-distributing face portion of the device. Fig. 3 shows the light-distributing faces in plan. Fig. 4 shows a section taken on the line 4—4 of Fig. 2. Fig. 5 shows in perspective the back of one of the light-distributing faces. Fig. 6 shows in vertical cross section a modified manner of adjustably supporting the light-distributing faces. Fig. 7 shows in plan one of the arms for supporting the light distributing faces shown in Fig. 6. To this special reference will hereinafter be made.

Referring to the drawings:—A represents the dome of the device, B a series of light-distributing faces arranged beneath the dome and adapted to receive and distribute reflected light cast onto the interior reflecting surface of the dome by a burner C located inside the same. We prefer that the light-distributing faces may hang supported from the dome and the dome itself be supported by suspending the same from a hanging fixture.

D represents the hanging fixture which we prefer to employ inasmuch as it affords both means for yieldingly supporting the device and also means providing a support on which the burner may be adjustably mounted for purposes which will hereinafter be explained. Referring to the hanging fixture D in detail it comprises a yielding spring portion or wire $d$ having ends $d^1$ bent into the form of hooks by which this portion of the fixture may be caught onto the ceiling of the room or other primary support from which the device is to hang. Connecting with the spring wire or body portion $d$ of the fixture is a link or chain connection $d^2$ which may be of such length as to give the necessary extent of hang to the device. The link $d^2$ connects with a fixture-supporting portion $d^3$ which like the portion $d$ of the fixture is also preferably made of bent wire. The peculiarity of this portion $d^3$ of the fixture especially to be noted resides in the parallel vertical arrangement of the rods $d^4$ which extend downwardly from the head of this portion $d^3$ of the fixture and the ends of which rods are bent into the form of hooks $d^5$ which catch onto an annular flange $a$ projecting from the upper portion of the dome and surrounding an entrance or opening into the same from the top thereof through which the burner C is introduced. The burner is mounted upon the rods $d^4$, being interposed between the same, there being secured to the body $c$ of the burner a collar $c^1$ provided with projecting ends $c^2$ which loosely embrace the respective rods $d^4$ of the fixture and become affixed thereto upon tightening the screws $c^3$. When the screws $c^3$ are loosened the burner may be moved adjustably on the rods $d^4$ to any desired point and there become affixed to the rods as above described. The particular advantage of this adjustability of the burner resides in the fact that in order that the rays emanating from the burner may strike the interior reflecting surface of the dome so as to be cast upon the distributing faces B it is necessary that the burner shall be moved to a precise and proper position relatively to the interior surface of the dome.

Reference will now be made to the mode of supporting the light-distributing faces B from the dome and to the arrangement, also, by which these faces may be adjustably turned whereby the inclination thereof may become varied. By reference to Fig. 2 it will be seen that the faces B are connected to a common supporting post or rod $b$. Connecting with the upper end of this post $b$ are a series of wires $e, e^1, e^2, e^3$ which are caught or hooked onto the bottom end of the dome, the inner ends of the wires overlapping one another and lying interposed between washers $b^1, b^2$, the washer $b^1$ being affixed to the rod $b$ and the washer $b^2$ being loosely arranged thereon. Above the washer $b^2$ on the rod $b$ is a nut $b^3$ which acts, when it is tightened, to bind the ends of the wires connecting with the dome between the washers, holding the wires securely in place. We prefer that the wires $e, e^1, e^2, e^3$ which connect with the dome and support the light-distributing faces may, after connecting therewith, be extended down to pass around the bottoms of the light-distributing faces and catch onto the lower end of the supporting post or rod $b$, such extension of the wires providing not only an additional support but affording also added stability of support to the light-distributing faces.

Each of the light-distributing faces B is adjustably secured to or connected with the supporting post or rod $b$ in the following manner: Arranged at the upper end of the post or rod $b$ below the washer $b^1$ are flanges $b^4, b^5$, the flange $b^5$ being arranged on the rod above the flange $b^4$ and each flange being provided with holes or openings $b^6$ therein. The upper ends of the respective faces may be caught or hooked onto these flanges by means of hooks connecting with the faces passing through the holes or openings in the flanges. By thus hooking the faces onto the respective flanges as above indicated the faces may be turned freely in different angular directions. In this connection it is to be noted that the holes or openings in the upper and lower flanges are so disposed that one face is caught onto the lower flange and the face or faces adjacent to it onto the upper flange, this arrangement permitting the faces to be more easily turned without interference with one another than if adjacent faces were supported from the same flange.

Arranged upon the post or rod $b$ some little distance removed from the bottom thereof is a nut $b^7$. Between this nut, acting as a stop, and a winged or tightening nut $b^8$ are interposed a series of arms $b^9$ radially extending and connecting with the respective faces preferably at or about the points of their bottom corner edges, there being preferably two connecting arms for each face. In order that each face may be angularly turned or the inclination thereof varied, each arm $b^9$ is adapted to slide upon the post or rod $b$ by a slot $b^{10}$ cut in the arm. Accordingly when the winged or tightening nut $b^8$ is loosened the arms $b^9$ may be moved in or out relatively to the supporting post or rod as the angular position of any one or all of the faces B is varied, after which the face or faces may be held in such angular position by tightening the nut $b^8$, thereby clamping the arms between the tightening nut and the nut $b^7$ fixed on the rod.

The ends of the rods $b^9$ are connected with the respective faces by means of holes or openings $b^{11}$ formed in the ends of the rods into which hooks arranged upon the faces are adapted to catch. As above described, hooks are also arranged upon the upper ends of the faces which catch onto the flanges $b^4, b^5$. The faces are usually made of mirror glass and it is a somewhat difficult matter to provide them with these hooks. We have provided, however, a very simple and efficient means for so doing, which means is best shown in Fig. 5. The hook at the upper end of each of the faces is provided by means of a wire $f$, one end of the wire being looped around the upper end or apex of the face and then bent into the form of a hook $f^1$ which may connect with one or the other of the flanges $b^4, b^5$ depending upon the disposition of the face. The other end of the wire $f$ extends across the back of the face and is caught under a wire $f^2$. The wire $f^2$ extends to the respective bottom corners of the face around which the ends of the wire are looped or turned and the wire then twisted and bent into the form of hooks $f^3, f^4$ which catch onto the ends of the adjustable holding arms $b^9$. The wire $f$ is caught around that portion of the wire $f^2$ intermediate the looped ends thereof which lies snugly adjacent to the back of the face and by bending the wire $f$ back upon itself after it has been caught under the wire $f^2$ both wires become as it were fastened together, each acting to hold the other in place with the ends thereof properly looped over the apex and bottom corners of the face.

With the means above described the adjustability of the faces is very easily accomplished upon loosening the nut $b^8$ as above described. Moreover the faces by reason of the length of the radial arms and the disposition of the faces can be turned to have practically any required angular disposition especially a disposition in which two adjacent faces will be turned inwardly towards one another whereby rays of light reflected upon said faces may be thrown to a point common to both faces, as for example, the needle of a sewing machine or other small objective point. The advantage of such concentration of the rays is that not only is an exceedingly strong light thrown upon the needle or other objective point, but there is no shadow cast as might be the case if only one face were employed to cast this light upon such point.

In Fig. 6 there is shown a modification of the invention. In this figure G represents the respective light-distributing faces preferably made to present slightly curved surfaces. For supporting the faces G there is provided the support $G^1$. Pivotally mounted upon this support are a series of sets of upright arms $g, g^1$ connected by a body portion $g^2$ through which extends a pin or screw $g^3$ fastening into the support $G^1$. The arms $g, g^1$ turn rotatably around these pins or screws $g^3$ and the pins are set well out towards the outer edge of the support $G^1$ and are so relatively disposed that each set of arms $g, g^1$ may connect with and carry a face G. The connection between the faces and the respective arms $g, g^1$ is a pivotal one, each face being provided with horizontally turned pins $g^4$ fastened to the back thereof and extending into holes formed in the ends of the respective sets of arms. In this connection it may be observed that inasmuch as the arms $g, g^1$ are made of thin metal plate, they are accordingly sufficiently yielding whereby they may be sprung to receive the respective pins $g^4$. Thus supported the faces G may be turned pivotally in the ends of the arms $g, g^1$ whereby the inclination of each one of the respective faces may be varied, or by turning each set of arms $g, g^1$ around its pin $g^3$ the lateral angular direction of the respective faces may be changed. After the faces or any one of them has been turned to a proper angular position it is held in such position by the following described means: Through the center of the support $G^1$ there extends a pin or screw $g^5$ having a head $g^6$ and upon its threaded end extending below the support $G^1$ a tightening nut $g^7$. Arranged upon the pin or screw $g^5$ between the head thereof and the support $G^1$ are a series of radial arms $g^8$ which are adapted to slide radially upon the pin or screw by means of a slot $g^9$ cut in each arm. These arms engage respectively with the light-distributing faces G, each arm having a hole or opening formed in the end thereof by which the arm may be caught onto a hook $g^{10}$ fastened on the inside of each face. As the faces G are turned upon the arms $g, g^1$ to vary the inclination thereof, as before described, the arms $g^8$, upon loosening the nut $g^7$, will slide radially upon the pin $g^5$ to accommodate themselves to the adjusted angular inclination of the respective faces, after which upon tightening the nut $g^7$ the arms will be clamped and the faces held in such adjusted position. In order that the faces may be held in their laterally adjusted angular position after such has been once obtained there extends from each one of the body portions $g^2$, which connect the respective arms $g, g^1$ bearing the respective faces, an extension $g^{11}$ which is so far extended and of such form that whatever the laterally adjusted angular position of the faces may be, these extensions will in part and at all times fit between the head $g^6$ of the pin $g^5$ and the support $G^1$ so that when the nut $g^7$ is tightened these extensions, like the arms $g^8$, will be held clamped between the head of the pin $g^5$ and the support $G^1$ thereby holding the arms $g, g^1$ against any further rotatable movement and the faces against any further lateral angular variation, that is, until the nut $g^7$ is again loosened.

Having thus fully described our invention, we claim and desire to secure by Letters Patent of the United States:—

1. In a device of the character specified, the combination with a reflecting dome, of a series of light-distributing faces arranged to receive light reflected from said dome, a support for said faces, means for mounting said respective faces on said support whereby they may be turned angularly, said means comprising a series of adjustable arms radially disposed and connecting with said faces, said support also comprising in part a fixture with respect to which said arms may be moved radially or turned axially depending upon the adjusted angular position of said faces, and means for holding said arms after the adjustment of said faces has been obtained whereby they in turn may hold said faces in their adjusted position.

2. In a device of the character specified, the combination with a reflecting dome of a series of adjustable light-distributing faces arranged to receive light reflected from said dome, a series of adjustable arms radially disposed and connecting with said faces said arms having slots formed therein, and a clamp having a pin forming a common center for said arms whereby they may be engaged and held by said clamp, and with respect to which pin said arms are adjustable by the said slots formed therein whereby said arms may be adjusted to assume a position commensurate with the adjusted angular position of said faces prior to the engagement of said arms by said clamp.

3. In a device of the character specified, the combination with a reflecting dome, of a series of light-distributing faces arranged to receive light reflected from said dome, a support for said faces, means for mounting said faces on said support whereby they may be turned angularly, a series of adjustable arms radially disposed and connecting with said faces, and a clamp for engaging and holding said arms whereby they may hold said faces in the angular position to which they have been turned.

4. In a device of the character specified, the combination with a reflecting dome, of a series of light-distributing faces arranged to receive light reflected from said dome, a supporting post or rod, means for loosely hanging said faces from said post or rod whereby the angular position of said faces may be changed, a series of radial arms connecting with said faces, said post or rod forming a part of a common central support with respect to which said arms are radially and axially adustable, and means for clamping said arms in an adjusted position commensurate with the angular positions of said faces.

5. In a device of the character specified, the combination with a reflecting dome, of a series of light-distributing faces arranged to receive light reflected from said dome, a supporting post or rod for said faces, flanges arranged upon said post or rod one above the other, means whereby adjacent faces may be loosely attached to said respective flanges and said faces be turned to adjusted positions relatively to one another, and means for maintaining the faces in such adjusted positions.

6. In a device of the character specified, in combination, a reflecting dome, a series of light-distributing faces arranged to receive light reflected from said dome, a support on which said faces may be adjustably turned, arms for holding the faces in an adjusted position, and hooks arranged upon the backs of said respective faces whereby they may be attached to said support and arms.

7. In a device of the character specified, the combination with a reflecting dome of a series of light-distributing faces arranged beneath the dome, a supporting post or rod on which said faces are mounted, and a connection between said dome and the upper end of said post or rod whereby said faces may hang suspended from said dome.

8. In a device of the character specified, the combination with a reflecting dome, of a series of light-distributing faces arranged beneath the dome, a supporting post or rod on which said faces are mounted, and wire connections between said dome and post, said connections connecting with the top and bottom of said post substantially as described.

9. In a device of the character specified, the combination with a reflecting dome and a series of light-distributing faces arranged to receive light reflected from said dome, of a burner located within the dome, and means for adjustably supporting said burner.

10. In a device of the character specified, the combination with a reflecting dome and a series of light-distributing faces adapted to receive light reflected from said dome, of a burner located within the dome, a fixture connecting with said dome from which said dome is adapted to hang, and means for adjustably mounting said burner upon said fixture whereby the precise and proper adjustable location of said burner within the dome may be obtained.

JOHN B. PEARSON.
ERNEST W. PIERCE.

In presence of—
F. A. Peabody,
Bertha A. Fraser.